July 10, 1962   T. E. SHAUL   3,042,969
APPARATUS AND METHOD FOR MANUFACTURING MATS
Filed Nov. 23, 1959
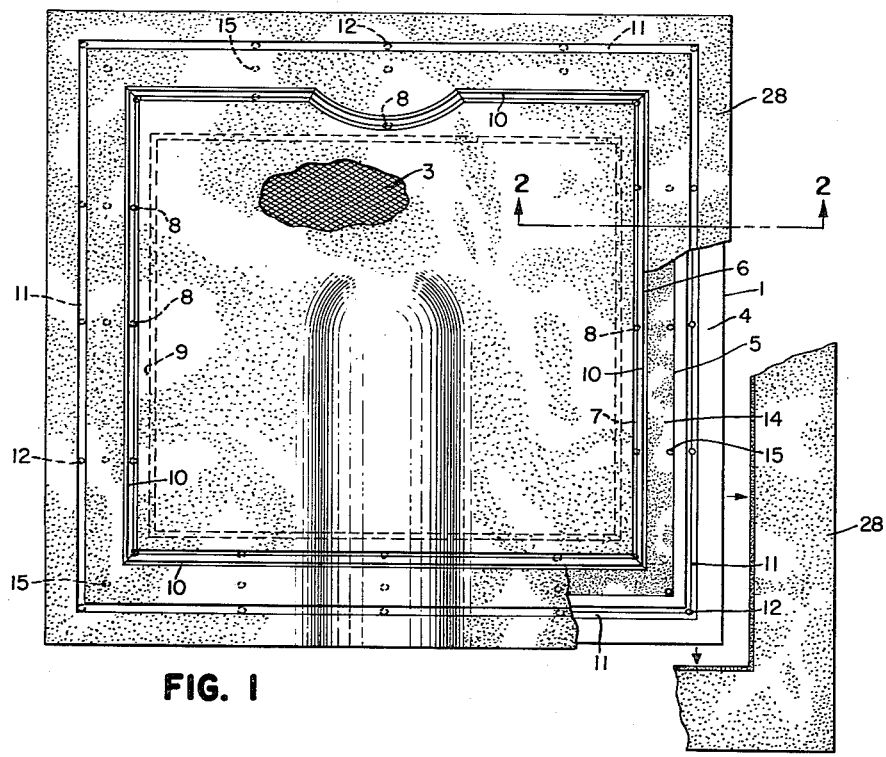
FIG. 1
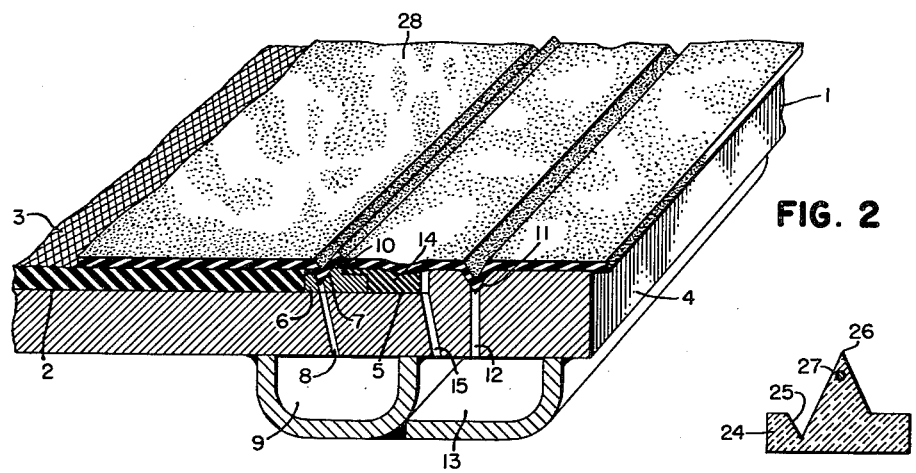
FIG. 2
FIG. 3
FIG. 4
INVENTOR.
THEODORE E. SHAUL
BY 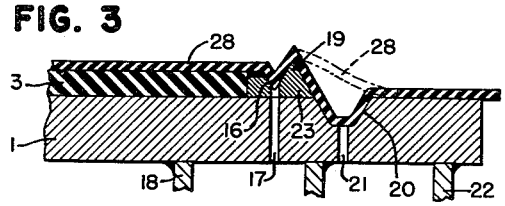
ATTORNEY

United States Patent Office 3,042,969
Patented July 10, 1962

3,042,969
APPARATUS AND METHOD FOR
MANUFACTURING MATS
Theodore E. Shaul, Akron, Ohio, assignor to The Goodyear Tire & Rubber Company, Akron, Ohio, a corporation of Ohio
Filed Nov. 23, 1959, Ser. No. 854,686
4 Claims. (Cl. 18—19)

This invention relates to a method and apparatus for manufacturing mats of rubber or other formable materials and more particularly to contoured floor mats such as used in automotive vehicles and the like.

Heretofore, in manufacturing contoured mats, it has been customary to place a sheet of the unvulcanized rubber stock on a contoured form and pulling the stock into intimate engagement with the form by means of a vacuum. The mold cavity is vented to the vacuum chamber at the strategic points and around the periphery of the mold so that the vacuum will be effective to keep stock pulled down against the form throughout the vulcanizing period. For vulcanizing, the exposed surface of the stock is subjected to steam pressure which assists in keeping the stock against the form and the vacuum is maintained at all times as well. Subsequent to the vulcanization, the formed mat is removed from the form and thence trimmed to the final size and shape. The material that is trimmed off of course is vulcanized and as a result is either scrap or requires reclaiming. The normal amount of trim material is substantial and consequentially, in a highly competitive field such as automobile floor mats, the reduction in amount or elimination entirely of the trim would make possible a considerable reduction in the cost of the mat. It is, therefore, an object of this invention to provide an apparatus and method for manufacturing contoured mats of rubber or rubber-like material which eliminate vulcanized trim.

Another object of the invention is to provide a mold which provides for trimming the excess stock from the blank of stock before vulcanizing and forming;

A further object of the invention is to provide a method of forming a mat or floor covering that does not require trimming after vulcanizing;

A still further object of the invention is to provide a mold structure that provides means to attain initially intimate contact between the blank of stock and mold cavity and maintain it during vulcanization after the trim is removed.

Other objects and advantages of this invention will become apparent hereinafter as the description thereof proceeds, the novel features, arrangements and combinations being clearly pointed out in the specification as well as the claims thereunto appended.

In the drawings:

FIG. 1 is a plan view of a typical mold with a portion of the mat removed;

FIG. 2 is a section taken along line 2—2 of FIG. 1;

FIG. 3 is a partial section of a modification of the invention; and

FIG. 4 is a section illustrating the modification of a portion of the invention.

In the drawings, a mold base 1 usually a casting includes a contoured cavity 2 in which the mat is formed and vulcanized. A typical construction for the cavity includes forming the cavity surface of a hard rubber, aluminum, epoxy resin or other suitable insert 3 having the desired surface characteristics. As shown, the mold base 1 is recessed to receive the cavity insert 3 so that the surface thereof is substantially flush with the outer marginal portion 4 of the mold base 1. The cavity insert 3 defines substantially the extent of the complete mat.

As seen, the cavity insert 3 does not completely fill the recessed portion of the mold base 1 so that between the edge of the cavity insert 3 and the marginal portion 4 of the mold base 1 a channel 5 remains. An insert 6, preferably of aluminum, steel or other good heat conducting material, is fastened in the channel 5 and extends around the entire periphery of the cavity insert 3. The insert 6 includes a sealing groove 7 positioned immediately adjacent the periphery of the cavity insert 3 and as shown has a series of openings or air bleeds 8 spaced throughout its extent to communicate with the vacuum chamber 9 underlying the groove 7 on the bottom side of the mold 1.

The outer edge of the groove 7 is extended to form one side of a trimming edge 10 which as shown is an inverted V with the apex projecting above the surface of the cavity insert 3. The trimming edge 10 extends around the entire cavity periphery.

Spaced outwardly from the trimming edge 10 and extending around the complete periphery of the mold cavity 2 lies a second sealing groove 11 formed as shown in the marginal portion 4 of the mold base 1. A series of openings or air bleeds 12 extend to communicate with a second vacuum chamber 13 underlying the groove 11 on the underside of the mold base 1.

To provide for more efficient functioning of the trimming edge 10, it is desirable to insulate the top of the insert 6 and the adjacent portion of the mold base 1 with a material such as hard rubber 14. This insulating material 14 causes the residual heat of the mold to be concentrated in the trimming edge so as to provide for easier severing of the mat stock. If desired, a series of openings or air bleeds 15 through the insulating material 14 intermediate the trimming edge 10 and outer sealing groove 11 may be provided also to communicate with vacuum chamber 13.

In the modification of the invention shown in FIG. 3, the inner sealing groove 16 adjacent the cavity insert 3 has openings or air bleeds 17 in communication with the underlying vacuum chamber 18. A trimming edge 19 projecting above the cavity surface is bounded on the outer side by an adjacent deeper recessed sealing groove 20 with openings or air bleeds 21 communicating with vacuum chamber 22. As shown the sealing groove 16 and trimming edge 19 are in the form of an insert 23 which is mounted in the mold base 1 in a manner similar to insert 6.

Another type of insert 24 for mounting in the mold base 1 around the cavity insert 3 is illustrated in FIG. 4 and includes the inner sealing groove 25 and adjacent trimming edge 26. The insert 24 is formed of a refractory or ceramic material that is an electrical insulating material and has embedded therein adjacent the apex of the trimming edge 26 a resistance wire 27. When electric current flows through resistance wire 27, the trimming edge 26 is heated sufficiently to burn a cut immediately through the mat stock in contact with the edge.

In the operation of the apparatus a blank sheet of mat stock 28 of rubber or rubber-like material of a size larger than that of the finished mat is positioned over the mold base 1 and is manipulated by the operators so as to contact the cavity insert 3 over substantially the entire area. This is particularly important around the severe contoured portions of the mold form. The sheet of stock 28 is then urged in contact with the sealing groove adjacent the cavity insert 3 so that contact is complete around the entire mold periphery. During this operation the vacuum in the vacuum chambers is operating and as a result the air is bled from between the cavity insert 3 and the sheet of mat stock 28 to cause complete intimate contact between the cavity insert 3 and the sheet 28 of stock. Simultaneously with the engaging of the sheet of mat stock 28 with the inner sealing groove intimate contact is also produced with the outer sealing groove. The vacuum also will withdraw all the air between the mat mold and sheet of mat stock in the area between the two sealing grooves. At this time the mat stock is severed over the cutting edge by, for example, rolling a wooden roller over the sheet 28 of mat stock at this point around the periphery of the mold. The vacuum in the outer vacuum chamber then is cut off and the trim excess is removed from the mold. The vacuum in the inner vacuum chamber remains on and maintains as a result the intimate contact between the mat form and sheet of mat stock 28 since it is completely sealed around the periphery of the mat cavity in the inner sealing groove. The sheet 28 of mat stock is then subjected to heat and pressure for vulcanization and permanent forming.

In the form of the invention shown in FIG. 3 after the seal is effected at the inner sealing groove 16 the marginal portion of the sheet 28 of mat stock is then urged down into the outer sealing groove 20. Due to the stretching of the material down into the groove 20 by the application of the vacuum pulling the air out between the mat stock and the groove, the stock is severed at the trimming edge 19 as the stock is pulled tightly into the trimming groove.

By using an insert such as shown in FIG. 4, the mat may be trimmed after it is positioned on the mold by energizing the electric resistance wire to heat the trimming edge 26 to substantially burn or cut through the mat stock. The trim is then removed before the vulcanization is completed.

It is apparent that if cutouts are to be made in the mat interiorly of the edges, similar sealing grooves and cutting edge may be provided in the mat form to form the cutout. The contour and configuration of the mat may be made to fit the particular vehicle as is well known in present practice.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A mold for shaping and vulcanizing a mat comprising a mold member with a cavity having the contour and configuration of the finished mat, a trimming edge on said mold member extending around the entire periphery of the mat cavity, a sealing surface adjacent said trimming edge on the cavity side thereof, a vacuum chamber in communication with said sealing surface, a second sealing surface extending around the periphery adjacent said trimming edge on the side opposite to said first sealing surface, a second vacuum chamber in communication with said second sealing surface, a source of vacuum connected to said second vacuum chamber and means to independently control the vacuum in each chamber, whereby vacuum may be effected in either or both chambers as desired.

2. A mold for shaping and vulcanizing a mat comprising a mold member with a cavity having the contour and configuration of the finished mat, a trimming edge on said mold member projecting above the cavity surface and extending around the entire periphery of the mat cavity, a sealing surface adjacent said trimming edge on the cavity side thereof, a vacuum chamber in communication with said sealing surface, a second sealing surface extending around the periphery of said trimming edge on the side opposite to said first sealing surface, a second vacuum chamber in communication with said second sealing surface, a source of vacuum connected to said second vacuum chamber and means to independently control the vacuum in each chamber, whereby vacuum may be effected in either or both chambers as desired.

3. A mold for shaping and vulcanizing a mat comprising a mold member with a cavity having the contour and configuration of the finished mat, an inverted V-shaped trimming edge on said mold member projecting above the cavity surface and extending around the entire periphery of the mat cavity, a groove forming a sealing surface on the cavity side of said trimming edge and adjacent thereto, a vacuum chamber in communication with a series of spaced openings extending from said chamber into said groove, a second groove forming a sealing surface spaced outwardly from said trimming edge and extending therearound on the side opposite to said first groove, a second independent vacuum chamber having a series of spaced openings extending from said chamber into said second groove, a source of vacuum connected to said second vacuum chamber and means to independently control the vacuum in each chamber, whereby vacuum may be effected in either or both chambers as desired.

4. The steps in the method of manufacturing a mat of predetermined contour and surface configuration from a formable stock which consists of positioning a sheet of stock on a mold surface of the desired contour having a depressed sealing groove about the periphery thereof and a second depressed sealing groove outwardly spaced from said first groove, each groove having a series of openings therein in communication with an independent vacuum chamber, subjecting each sealing groove to vacuum, urging the sheet of stock into intimate engagement with said mold and grooves, severing the stock around the periphery of the mold adjacent said first groove on the side toward said second groove, releasing the vacuum on said second groove while maintaining it on said first groove, removing the material from said sheet of stock, subjecting the mold to heat to permanently form the stock and releasing the vacuum on said first groove whereby the formed mat may be removed from the mold.

References Cited in the file of this patent

UNITED STATES PATENTS

| | | |
|---|---|---|
| 1,324,850 | Roberts | Dec. 16, 1919 |
| 1,540,872 | Bates | June 9, 1925 |
| 1,754,502 | Denmire | Apr. 15, 1930 |
| 2,615,111 | Paquette et al. | Oct. 21, 1952 |
| 2,691,797 | Bertleff et al. | Oct. 19, 1954 |
| 2,702,411 | Winstead | Feb. 22, 1955 |
| 2,889,651 | Baldanza | June 9, 1959 |
| 2,926,385 | Wilson | Mar. 1, 1960 |

FOREIGN PATENTS

| | | |
|---|---|---|
| 1,165,692 | France | Oct. 28, 1958 |
| 755,638 | Great Britain | Aug. 22, 1956 |